(No Model.)

J. CHASE.
TROLLEY WIRE FINDER.

No. 499,095.  Patented June 6, 1893.

Witnesses.
Robt. Smith
Thos. A. Green

Inventor
James Chase.
By
James L. Norris,
Atty.

UNITED STATES PATENT OFFICE.

JAMES CHASE, OF ROCHESTER, NEW YORK.

TROLLEY-WIRE FINDER.

SPECIFICATION forming part of Letters Patent No. 499,095, dated June 6, 1893.

Application filed January 23, 1893. Serial No. 459,333. (No model.)

*To all whom it may concern:*

Be it known that I, JAMES CHASE, a citizen of the United States, residing at Rochester, in the county of Monroe and State of New York, have invented new and useful Improvements in Shippers or Guides for Trolleys, of which the following is a specification.

The object of this invention is to provide a trolley pole or arm with a simple, light, durable and inexpensive shipper or guide attachment for replacing the trolley wheel in contact with the electric conductor or trolley wire of an over-head electric railway system.

The invention comprises a novel form of shipper fulcrumed to the under side of a trolley arm and composed of parallel spaced apart arms adapted to be swung upward between the flanges of the trolley wheel in bracing contact with the inner sides of said flanges and the face of the wheel, said shipper carrying at its upper end a single guide arm or feeler to be brought in contact with one side of the trolley wire when the shipper is operated, thereby assisting in the turning of curves and in the replacing of the trolley wheel when necessary.

My invention also consists in the combination and relative arrangement of parts in a trolley shipper or guide as hereinafter more particularly set forth.

The invention is illustrated in the annexed drawings, in which—

Figure 1:
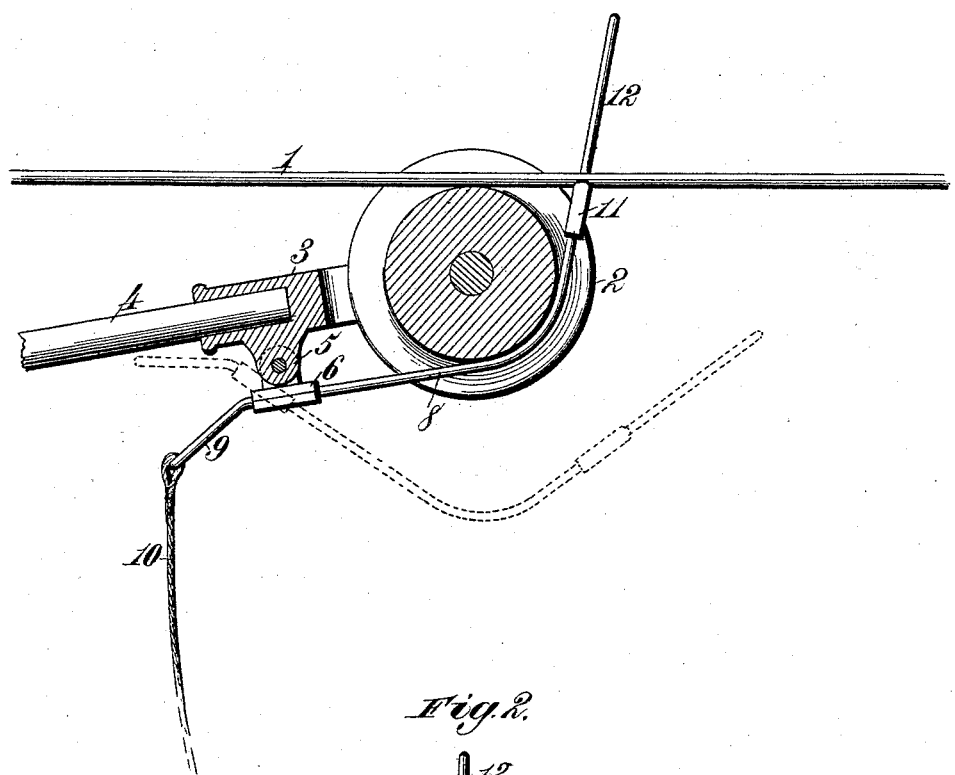
Figure 2:
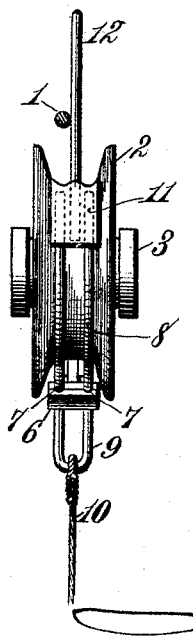

Figure 1 represents the upper portion of a trolley pole provided with my improved guide attachments. Fig. 2 is a view of the trolley wheel and guide attachments, with the trolley wire in cross section.

In the drawings the numeral 1 indicates the trolley wire which may be supported in any suitable or well known manner from cross wires, not shown. The trolley wheel 2 is carried in an arm 3 attached to the upper end of a trolley pole 4 the lower end of which is pivoted or swiveled to a car as usual. On the under side of the trolley arm 3 is a depending lug 5 to which is jointed or hinged a clamp 6 which is provided with two parallel passages 7 for receiving the opposite or parallel arms of a wire shipper 8 for guiding the trolley wheel to its place in contact with the overhead trolley wire. The shipper 8 is preferably composed of a piece of wire bent or doubled at the center and then passed through the parallel passages 7 of the hinged or tipping clamp 6 by which the shipper is held securely and with its two opposite arms at a suitable distance apart. The bent or doubled portion of the wire shipper 8 forms a loop 9 for attachment of a rope or cord 10 through which the shipper is operated. The opposite or parallel arms of the shipper 8 are bent upward in position to be capable of being brought in close contact with a forward portion of the periphery or face of the trolley wheel 2 and also in close contact with the inner sides of the wheel flanges. By thus arranging the parallel arms of the shipper 8 between and in close contact with the inner walls of the trolley wheel flanges all side strain on the hinged or tipping clamp 6 and its supporting lug 5 is avoided and the device may be made comparatively light without impairing its strength. The upper ends of the two arms of the wire shipper 8 are securely fastened into a block 11 which is of sufficient weight to assist the long arms of the shipper in tipping downward when the cord 10 is released. In about the center of the weighted block 11 is fastened a single upward projecting guide arm or feeler 12 which serves as a guide for replacing the trolley wheel in contact with the trolley wire whenever the trolley wheel is disengaged from or jumps from the conducting wire as may happen in turning curves or at other times. It will be seen that by pulling on the cord 10 the tipping clamp 6 will be rocked on its fulcrum at the lug 5 and the longer portion of the shipper 8 and attached block 11 will be raised so as to carry the guide arm or feeler 12 upward on one side of the trolley wire. By now pulling the trolley pole 4 around until the arm or feeler 12 strikes the trolley wire and then releasing the cord 10 to allow the trolley pole to rise, under the tension of the usual spring at its base, the trolley wheel will invariably catch the trolley wire. The trolley wheel can thus be readily engaged with the conducting wire, even in the dark, and without any delay or uncertainty. When the cord 10 is released the heavier end of the shipper, to which the block 12 and guide arm 11 are attached drops below the trolley wire and thus permits the guide arm or feeler to pass readily beneath the cross wires or guides by which the trolley wire is sustained.

Heretofore it has been common to provide a trolley shipper with two diverging guide arms arranged to extend normally below the trolley wire and its supports when the trolley wheel is in contact with the conductor. Such construction, of course, I do not claim. By employing only a single guide arm or feeler 12 arranged and operated in the manner hereinbefore described I am enabled not only to replace the trolley wheel more quickly and certainly than by the use of two diverging arms but I also greatly lessen the liability of obstruction to the operation of the shipper, from proximity to the supports or stays of the trolley wire. It is also obvious that if the cord 10 is held taut in turning curves the guide arm 12 thus made to project above the trolley wheel and in contact with the conductor will prevent the wheel from jumping out of place. If the trolley pole be drawn around so that the arm 12 will strike against the conductor 1 a contact is at once obtained and continues while the arm 12 slides along the trolley wire or conductor and until the trolley wheel is raised into position. The circuit can thus be established much sooner, with greater certainty, and with less trouble in passing guy wires, than is possible by the use of two diverging guide arms.

The block 11 forming part of the shipper serves to scrape ice or frost from the trolley wire or conductor and by imparting a succession of jerks to the cord 10 the block will readily knock off any incasing ice or snow.

By spacing apart the two parallel arms of the shipper 8 so as to secure a close contact with the face of the trolley wheel and the inside walls of its flanges the shipper will be securely braced and materially strengthened in such manner that it can be made of comparatively light and inexpensive construction and without involving any great weight.

What I claim as my invention is—

1. The combination with a trolley arm and a trolley wheel, of a tipping clamp pivotally suspended from the under side of the trolley arm, a shipper secured in said clamp and having two parallel spaced apart arms adapted to be carried upward in close contact with the face of the trolley wheel and the inner sides of its flanges, and a single guide arm or feeler rigidly connected with the upper end of said shipper and adapted to be moved in contact with one side of the trolley wire when the shipper is operated, substantially as described.

2. The combination with a trolley arm and a trolley wheel, of a shipper fulcrumed to the under side of the trolley arm and adapted to be swung upward between the trolley wheel flanges, a block secured to the upper end of said shipper and adapted to knock or scrape ice from the trolley wire, and a single guide arm or feeler secured in said block in position to be carried upward on one side of the trolley wire when the shipper is operated, substantially as described.

In testimony whereof I have hereunto set my hand in presence of two subscribing witnesses.

JAMES CHASE.

Witnesses:
WM. C. FARRAND,
WM. E. CRAIB.